(12) United States Patent
Handte et al.

(10) Patent No.: US 12,720,524 B2
(45) Date of Patent: Aug. 25, 2026

(54) ACCESS POINTS AND COMMUNICATION METHODS

(71) Applicant: Sony Group Corporation, Tokyo (JP)

(72) Inventors: Thomas Handte, Stuttgart (DE); Dana Ciochina, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 488 days.

(21) Appl. No.: 17/921,718

(22) PCT Filed: Mar. 18, 2021

(86) PCT No.: PCT/EP2021/056972
§ 371 (c)(1),
(2) Date: Oct. 27, 2022

(87) PCT Pub. No.: WO2021/223931
PCT Pub. Date: Nov. 11, 2021

(65) Prior Publication Data

US 2023/0171762 A1 Jun. 1, 2023

(30) Foreign Application Priority Data

May 6, 2020 (EP) .................................... 20173212

(51) Int. Cl.
*H04W 72/1263* (2023.01)
*H04W 72/0446* (2023.01)
*H04W 72/0453* (2023.01)

(52) U.S. Cl.
CPC ... *H04W 72/1263* (2013.01); *H04W 72/0446* (2013.01); *H04W 72/0453* (2013.01)

(58) Field of Classification Search
CPC ......... H04W 72/1263; H04W 72/0446; H04W 72/0453; H04W 72/27; H04W 84/12; H04W 92/20; H04B 7/024
See application file for complete search history.

(56) References Cited

U.S. PATENT DOCUMENTS 12,101,769 B2 * 9/2024 Yukawa ................ H04W 72/12
2017/0142766 A1 * 5/2017 Kim ...................... H04W 48/20
(Continued)

FOREIGN PATENT DOCUMENTS

CN 106341847 A 1/2017
JP 2017092538 A 5/2017

OTHER PUBLICATIONS

International Search Report and Written Opinion mailed on Jun. 21, 2021, received for PCT Application PCT/EP2021/056972, filed on Mar. 18, 2021, 13 pages.
(Continued)

*Primary Examiner* — Yemane Mesfin
*Assistant Examiner* — Guoxing Fan
(74) *Attorney, Agent, or Firm* — XSENSUS, LLP

(57) ABSTRACT

A first access point comprises circuitry configured to generate AP schedule information that schedules, for subsequent data communication phases, the assignment of resources to one or more second access points to indicate which resources are assigned to a second access point for data communication in a subsequent data communication phase with its respective associated second stations, wherein the AP schedule information includes one or more AP schedules each comprising an assignment of resources to the one or more second access points, transmit the AP schedule information to the one or more second access points, and transmit, before and/or at the start of a data communication phase, AP trigger information to the one or more second access points to indicate which AP schedule to apply for the subsequent data communication phase.

20 Claims, 11 Drawing Sheets

| Identifier | AP 1 | AP 2 | ... | AP M |
|---|---|---|---|---|
| 1 | conf#1 of AP 1 | conf#1 of AP 2 | ... | conf#1 of AP M |
| 2 | conf#2 of AP 1 | conf#2 of AP 2 | ... | conf#2 of AP M |
| ... | ... | ... | ... | ... |
| N | conf#N of AP 1 | conf#N of AP 2 | ... | conf#N of AP M |

(56) References Cited

U.S. PATENT DOCUMENTS

| | | | | |
|---|---|---|---|---|
| 2020/0076551 | A1 | 3/2020 | Cherian | |
| 2020/0076552 | A1* | 3/2020 | Cherian | H04L 5/0035 |
| 2020/0304173 | A1* | 9/2020 | Chu | H04W 72/0453 |
| 2021/0111855 | A1* | 4/2021 | Verma | H04W 72/044 |
| 2021/0136679 | A1* | 5/2021 | Verma | H04W 74/002 |
| 2021/0345320 | A1* | 11/2021 | Lin | H04W 72/0453 |
| 2023/0107240 | A1* | 4/2023 | Sundman | H04B 7/0697<br>370/329 |
| 2023/0114857 | A1* | 4/2023 | Lou | H04L 5/0044<br>370/329 |
| 2023/0163808 | A1* | 5/2023 | Lou | H04W 74/002<br>455/101 |

OTHER PUBLICATIONS

Verma et al., "Coordinated AP Time/Frequency Sharing in a Transmit Opportunity in 11be", IEEE 802.11-19/1582r2, Jan. 2020, 15 pages.

IEEE, "Part 11: Wireless LAN Medium Access Control (MAC) and Physical Layer (PHY) Specifications", IEEE Computer Society, IEEE Std 802.11™-2016, Dec. 7, 2016, pp. 1-3532.

Kedem et al., "Multi-AP Operation—Basic Definition", IEEE 802.11-20-0617/r0, Apr. 16, 2020, 19 pages.

Doostnejad et al., "Uplink Coordinated Multi-AP", IEEE 802.11-19/1903r0, Nov. 11, 2019, 23 pages.

Chitrakar et al., "Preparations for Coordinated OFDMA", IEEE 802.11-20/0056r2, Jan. 10, 2020, 8 pages.

Seok et al., "Coordinated OFDMA Operation", IEEE 802.11-19/1788r1, Jan. 14, 2020, 15 pages.

* cited by examiner

ACCESS POINTS AND COMMUNICATION METHODS

CROSS-REFERENCE TO RELATED APPLICATIONS

The present application is based on PCT filing PCT/EP2021/056972, filed Mar. 18, 2021, which claims priority to EP 20 173 212.0, filed on May 6, 2020, the entire contents of each are incorporated herein by reference.

BACKGROUND

Field of the Disclosure

The present disclosure relates to first and second access points and corresponding communication methods.

Description of Related Art

In IEEE802.11ax standard amendment (in the following also briefly referred to as 802.11ax), multi-user support by frequency multiplex (e.g. OFDMA) and/or spatial multiplex (MU-MIMO) has been introduced. Each feature is supported in downlink, i.e., the AP (access point) transmits to one or more STAs (stations), and in uplink, i.e., one or more STAs transmit to the AP.

In coordinated multi-AP, it is envisioned that multiple APs align their resources such that mutual interference is suppressed or minimized, and communication is spectrally efficient by use of small guard bands. The coordinated APs often operate in a synchronous fashion. In such a setup, there are two types of APs, namely one sharing AP (also called first AP herein) and one or more shared APs (also called second APs herein). The sharing AP obtains a transmit opportunity (TXOP), i.e. it won channel contention and transmits first, which it is going to share with other APs. The one or more APs, which are coordinated by the sharing AP, are called the shared APs. Both a sharing AP and a shared AP may participate in coordinated multi-AP data transmission, but the sharing AP initiates the setup, distributes resources, and initiates the data transmission. The sharing AP is the ruling AP, it may thus be seen as a type of master AP, whereas a shared AP is compliant to sharing AP's settings, it may be seen as a type of slave AP.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present disclosure.

SUMMARY

It is an object to achieve a more efficient data communication thus provide more time for the data communication phase.

According to an aspect there is provided a first access point comprising circuitry configured to generate AP schedule information that schedules, for subsequent data communication phases, the assignment of resources to one or more second access points to indicate which resources are assigned to a second access point for data communication in a subsequent data communication phase with its respective associated second stations, wherein the AP schedule information includes one or more AP schedules each comprising an assignment of resources to the one or more second access points, transmit the AP schedule information to the one or more second access points, and transmit, before and/or at the start of a data communication phase, AP trigger information to the one or more second access points to indicate which AP schedule to apply for the subsequent data communication phase.

According to a further aspect there is provided a second access point comprising circuitry configured to generate STA schedule information that schedules, for subsequent data communication phases, the assignment of resources to one or more associated second stations to indicate which resources are assigned to a second station for data communication in a subsequent data communication phase with the second access point, wherein the STA schedule information includes one or more STA schedules each comprising an assignment of resources to the one or more second stations, transmit the STA schedule information to the one or more associated second stations, and transmit, before and/or at the start of a data communication phase, STA trigger information to the one or more associated second stations to indicate which STA schedule to apply for the subsequent data communication phase.

According to a further aspect there is provided another second access point comprising circuitry configured to receive and store AP schedule information from a first access point, AP schedule information scheduling, for subsequent data communication phases, the assignment of resources to one or more second access points to indicate which resources are assigned to a second access point for data communication in a subsequent data communication phase with its respective associated second stations, wherein the AP schedule information includes one or more AP schedules each comprising an assignment of resources to the one or more second access points, receive, before and/or at the start of a data communication phase, AP trigger information from the first access points to indicate which AP schedule to apply for the subsequent data communication phase, select the AP schedule indicated by the AP trigger information from the stored AP schedule information, apply the selected AP schedule for the subsequent data communication phase for communicating with its associated one or more second stations.

According to still further aspects corresponding first and second communication methods, a computer program comprising program means for causing a computer to carry out the steps of the methods disclosed herein, when said computer program is carried out on a computer, as well as a non-transitory computer-readable recording medium that stores therein a computer program product, which, when executed by a processor, causes the methods disclosed herein to be performed are provided.

Embodiments are defined in the dependent claims. It shall be understood that the disclosed communication methods, the disclosed computer program and the disclosed computer-readable recording medium have similar and/or identical further embodiments as the claimed communication devices and as defined in the dependent claims and/or disclosed herein.

One of the aspects of the disclosure is to reduce signaling overhead of the setup phase significantly by introducing persistent schedules that hold various configurations. The execution of a configuration of such a schedule is effected by a trigger, e.g. very short trigger frames. The disclosed idea enlarges the time period of synchronous data exchange in comparison to the related setup phase, if same or similar schedules are executed frequently.

The foregoing paragraphs have been provided by way of general introduction and are not intended to limit the scope of the following claims. The described embodiments, together with further advantages, will be best understood by reference to the following detailed description taken in conjunction with the accompanying drawings.

BRIEF DESCRIPTION OF THE DRAWING

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
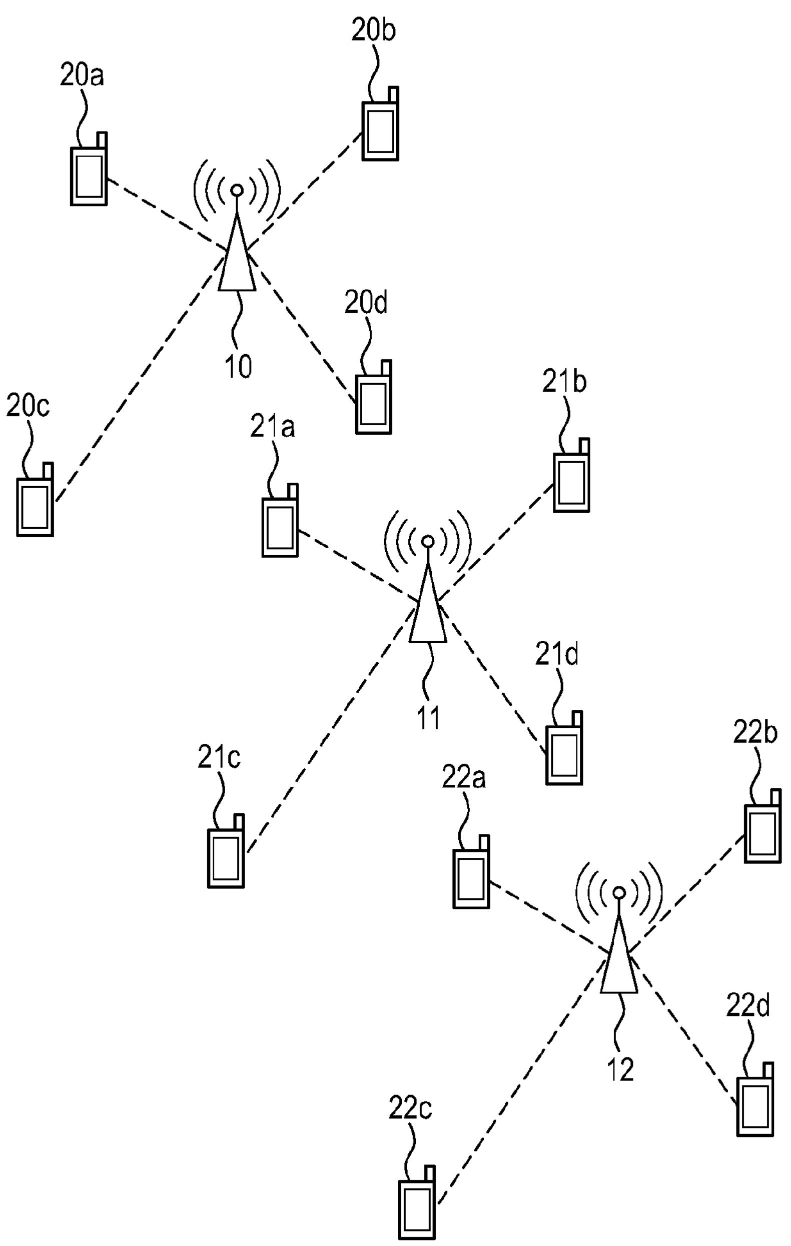
FIG. 1 shows a schematic diagram of a communication system according to the present disclosure.

Referring now to the drawings, wherein like reference numerals designate identical or corresponding parts throughout the several views, FIG. 1 shows a schematic diagram of communication system according to an embodiment of the present disclosure. The communication system is configured with one or more (in this exemplary embodiment three) first communication devices 10, 11, 12 operating as access point (AP), to each of which one or more (in this exemplary embodiment four) second communication devices 20*a*-20*d*, 21*a*-21*d*, 22*a*-22*d* operating as station (STA) are associated. Each of the APs and STAs has a wireless communication function. Particularly, each of the APs has a multi-user communication function of transmitting frames to one or more STAs. In the communication system, multi-user communication from an AP to a plurality of STAs can be performed, i.e. an AP is able to simultaneously communicate with a group of two or more STAs using frequency multiplex and/or MU-MIMO communication. Communication from an AP to an associated STA is referred to as downlink (DL) and communication from an STA to its AP is referred to as uplink (UL).

To enable MIMO communication, an AP may be equipped with multiple antennas and multiple RF chains, allowing it to transmit multiple streams simultaneously to one or more STAs. Each STA device may have multiple antennas and multiple RF chains to simultaneously receive multiple stream from an AP or simultaneously transmit multiple streams to an AP.

For example, as illustrated in FIG. 1, the communication system may be configured with the APs 10-12 and a plurality of STAs 20*a*-20*d*, 21*a*-21*d*, 22*a*-22*d*. As an example, the AP 10 and the STAs 20*a*-20*d* are connected to each other via wireless communication and perform transmission and reception of frames directly with each other (i.e. from the AP 10 to one or more STAs 20*a*-20*d* and from one or more STAs 20*a*-20*d* to the AP 10). For example, the AP 10 is a communication device conforming to IEEE 802.11 and transmits a SU or MU DL PPDU (single-user or multi-user downlink PHY protocol data unit) having one or more of the STAs 20*a*-20*d* as a destination. Similarly, STAs 20*a*-20*d* or a subset may transmit UL PPDUs at same time on different resource units in order to communicate simultaneously with the AP 10. Often, the UL PPDUs are trigger-based (TB) PPDUs to ensure a precise timely alignment. The trigger may be transmitted by AP 10 followed by one or more TB PPDU after a predefined time interval by one or more STAs 20*a* to 20*d*.

Figure 2:
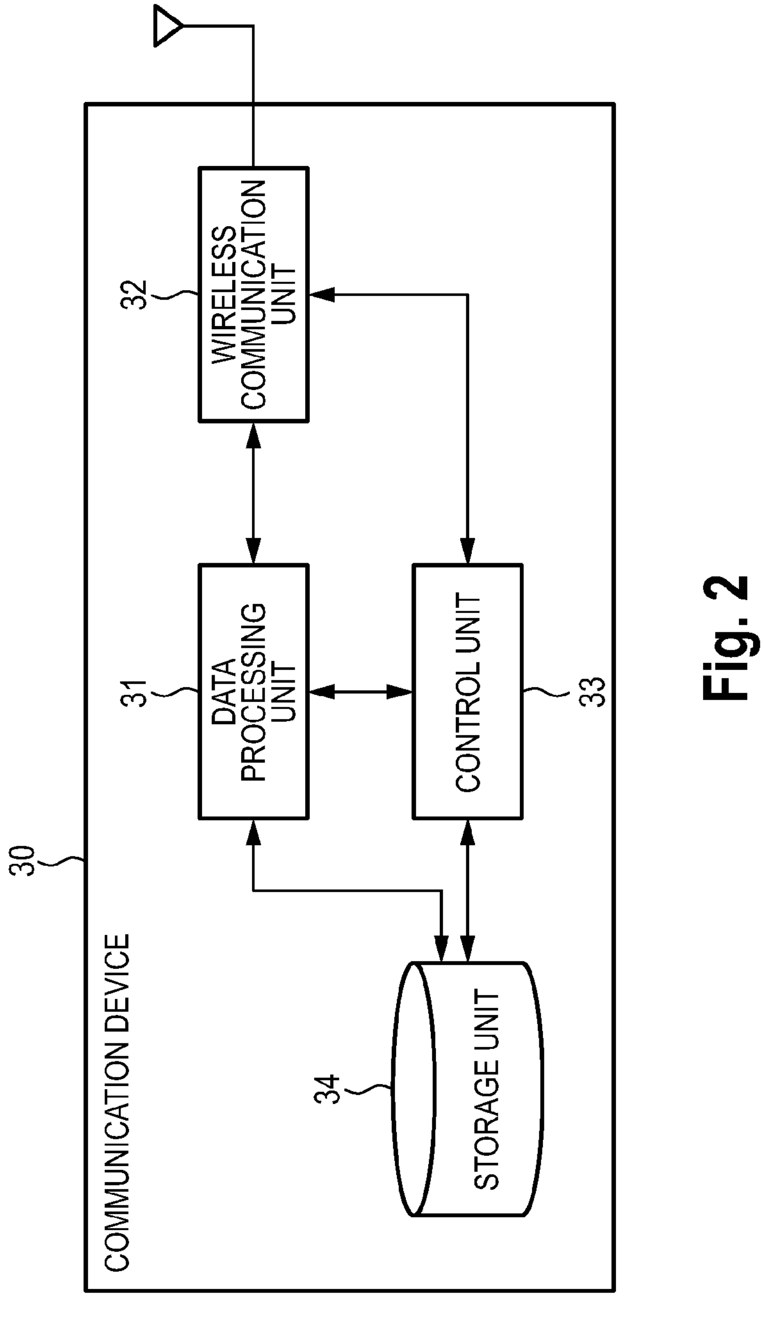
FIG. 2 shows a schematic diagram of the configuration of a communication device according to an embodiment of the present disclosure.

FIG. 2 shows a schematic diagram of the configuration of a communication device 30 according to an embodiment of the present disclosure. Generally, each of the APs and the STAs may be configured as shown in FIG. 2 and may include a data processing unit 31, a wireless communication unit 32, a control unit 33, and a storage unit 34.

As a part of a communication device 30, the data processing unit 31 performs a process on data for transmission and reception. Specifically, the data processing unit 31 generates a frame on the basis of data from a higher layer of the communication device 30, and provides the generated frame to the wireless communication unit 32. For example, the data processing unit 31 generates a frame (or a packet, in particular a MAC packet) from the data, and performs a process on the generated frame such as addition of a MAC header for media access control (MAC), addition of an error detection code, or the like. In addition, the data processing unit 31 extracts data from the received frame, and provides the extracted data to the higher layer of the communication device 30. For example, the data processing unit 31 acquires data by analyzing a MAC header, detecting and correcting a code error, and performing a reorder process, or the like regarding the received frame.

In this context, in WLAN terminology a frame is referred to as Service Data Units from higher layer data, to which further processing such as fragmentation, aggregation, header addition, etc. is applied in order to create MAC layer frames. Further, in WLAN terminology a packet is referred to as PHY protocol data unit (PPDU). Packets may further be understood as Physical Layer packets.

The wireless communication unit 32 has a signal processing function, a wireless interface function, and the like as part of a communication unit.

The signal processing function is a function of performing signal processing such as modulation on frames. Specifically, the wireless communication unit 32 performs encoding, interleaving, and modulation on the frame provided from the data processing unit 31 in accordance with a coding and modulation scheme set by the control unit 33, adds a preamble and a PHY header, and generates a symbol stream. Further, the wireless communication unit 32 acquires a frame by performing demodulation, decoding, and the like on the symbol stream obtained by a process of the wireless interface function, and provides the obtained frame to the data processing unit 31 or the control unit 33.

The wireless interface function is a function to transmit/receive a signal via one or more antennas. Specifically, the wireless communication unit 32 converts a signal related to the symbol stream obtained through the process performed by the signal processing function into an analog signal, amplifies the signal, filters the signal, and up-converts the frequency. Next, the wireless communication unit 32 transmits the processed signal via the antenna. In addition, on the signal obtained via the antenna, the wireless communication unit 32 performs a process that is opposite to the process at the time of signal transmission such as down-conversion in frequency or digital signal conversion.

As a part of the communication unit, the control unit 33 (often referred to as station management entity (SME)) controls entire operation of the communication device 30. Specifically, the control unit 33 performs a process such as exchange of information between functions, setting of communication parameters, or scheduling of frames (or packets) in the data processing unit 31.

The storage unit 34 stores information to be used for processing to be performed by the data processing unit 31 or the control unit 33. Specifically, the storage unit 34 stores information stored in a transmission frame, information acquired from a receiving frame, information on a communication parameter, or the like.

In an alternative embodiment, each of the APs and the STAs, may be configured by use of circuitry that implements the units shown in FIG. 2 and the functions to be carried out. The circuitry may e.g. be realized by a programmed processor. Generally, the functionalities of APs and STAs and the units of the communication device 30 shown in FIG. 2 may be implemented in software, hardware or a mix of software and hardware.

Figure 3:
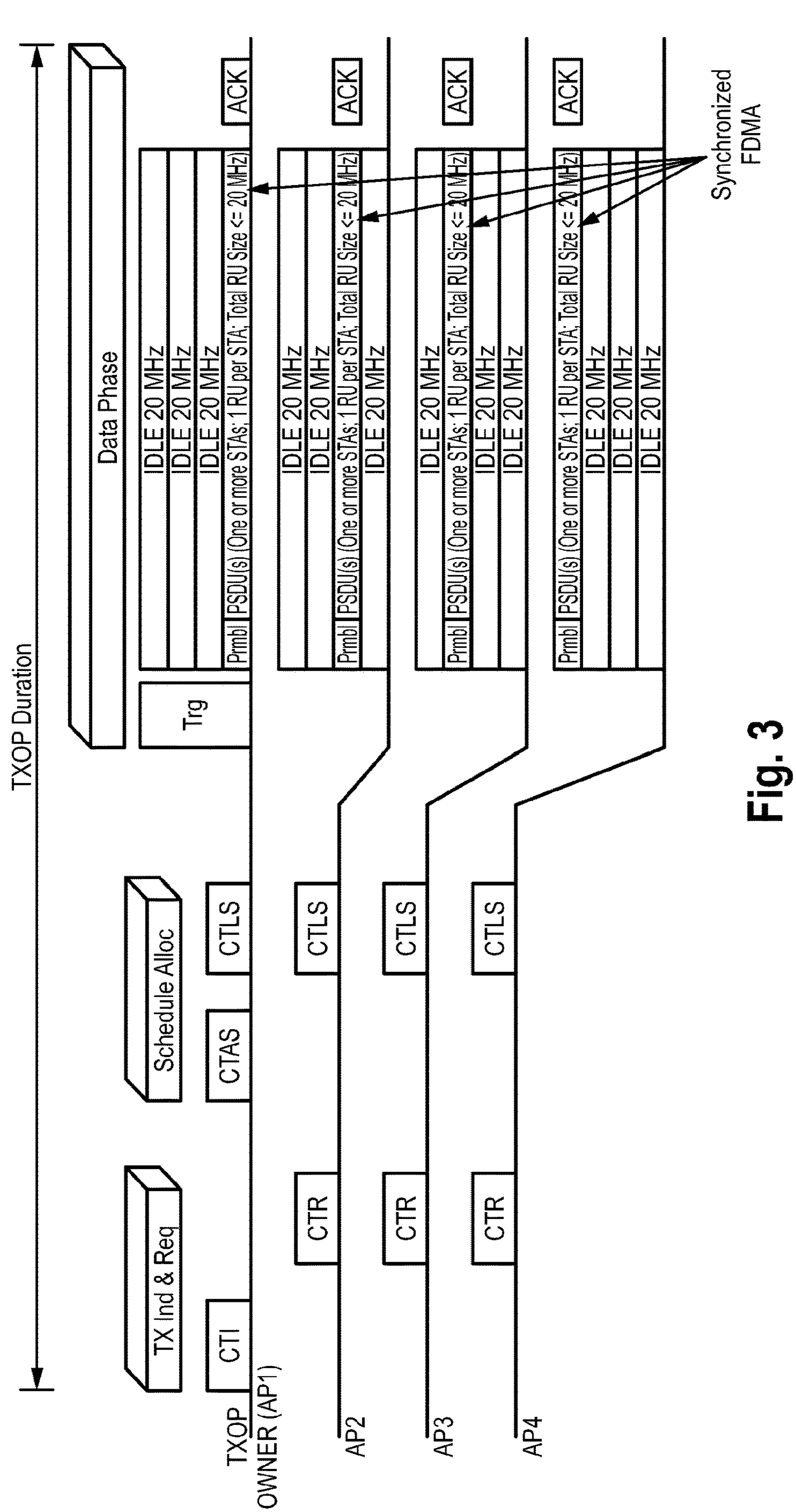
FIG. 3 shows a schematic diagram illustrating coordinated multi-AP using FDMA for data transmission.

FIG. 3 shows a schematic diagram illustrating the known basic operation of coordinated multi-AP using frequency division multiple access (FDMA) for data transmission. It consists of 3 phases.

In a first phase (also called TX indication and request phase, TX Ind & Req), transmission indication and request (TX Ind & Req), a sharing AP (AP1) indicates that it is willing to share its obtained TXOP (coordinated transmission indication (CTI) sub phase) and a shared AP (AP2, AP3, AP3) responds to this indication and requests its resources based on its needs (coordinate transmission response (CTR) sub phase). In a simple setup, a sub phase may be a PPDU including a corresponding frame that indicates the related information. In more advanced setups, a sub phase may consist of multiple PPDUs in the context of a frame exchange.

In a second phase (also called scheduling phase or schedule allocation phase, Schedule Alloc), the sharing AP (AP1) assigns and indicates the resources that each AP may use in an upcoming data phase (also called data communication phase) in the coordinated transmission AP scheduling (CTAS) sub phase and the sharing and shared APs indicate resources that each AP may use (i.e., assign) to the one or more STAs that each AP is serving (coordinated transmission local scheduling (CTLS) sub phase).

It shall be noted that the scheduling phase (or schedule allocation phase) and/or the TX indication and request phase represent the setup phase for coordinated multi-AP and are referenced as "setup phase" herein.

In a third phase (the data phase or data communication phase), the sharing AP triggers each shared AP (and itself) to start transmission according to the schedule defined before. This initiates the coordinated data transmission and reception. After a predefined time interval, all APs start transmission to one or more associated STAs within the allocated resources. After the transmission ends, one or more STA of each AP may transmit a response frame such as an Ack or BAck. All transmissions are done such that they do not interfere with each other. In the data communication phase the begin and end of a transmission by both APs and STAs may be synchronized in time and frequency, i.e., all may have the same frequency reference and the same timing reference with a small accuracy tolerance.

Hence, in this scheme CTI is the indication that a sharing AP is willing to share (transmitted by AP1), CTR is the response by a shared AP indicating its needs (transmitted by AP2, AP3, AP4), CTAS is the indication which resources the sharing AP has assigned to shared APs (transmitted by AP1), CTLS is the indication of resources for the one or more STAs that an AP is serving, and Trg is the trigger that starts the coordinated transmission as defined in CTAS.

Figure 4:
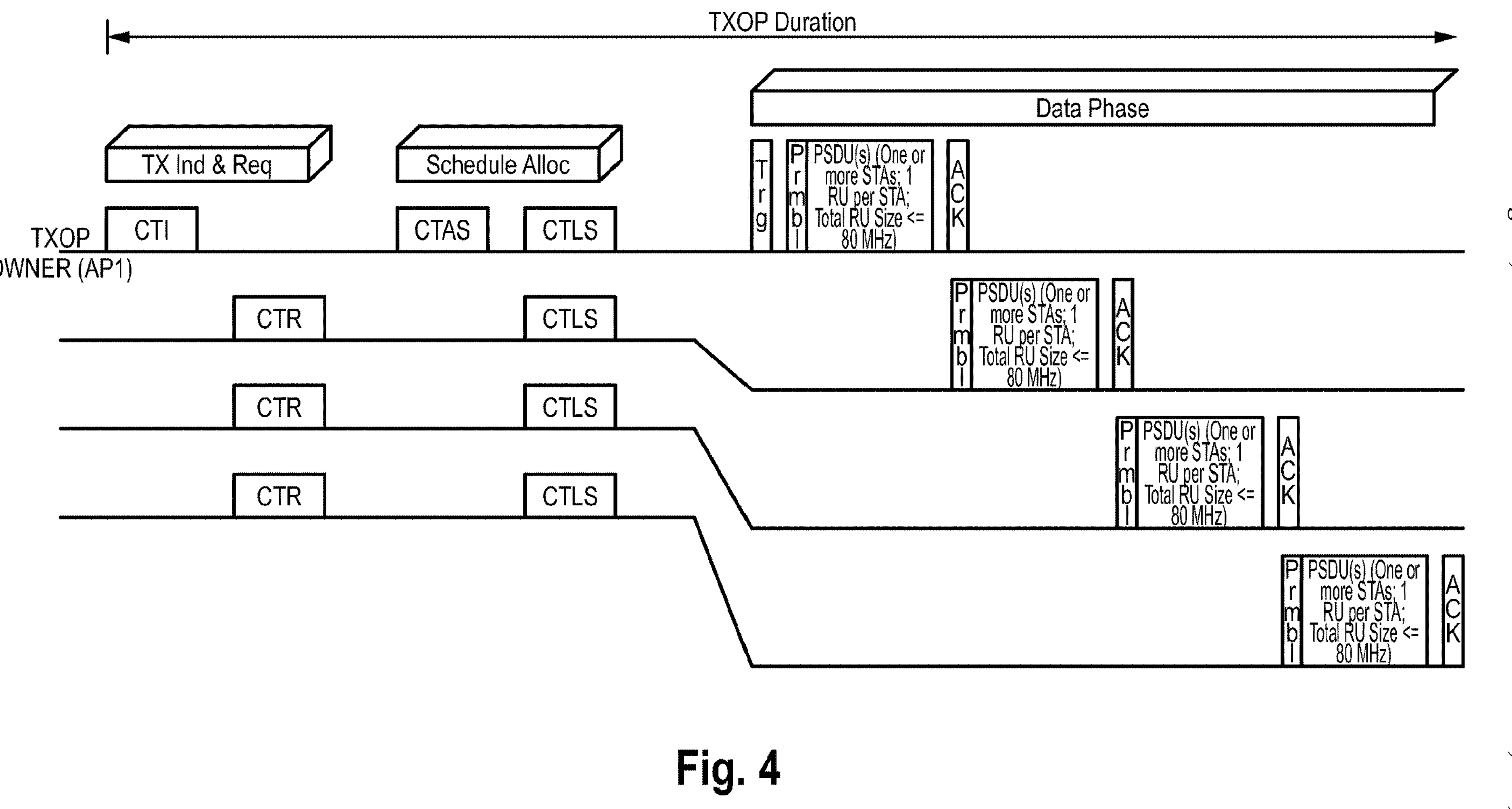
FIG. 4 shows a schematic diagram illustrating coordinated multi-AP using TDMA for data transmission.

FIG. 4 shows a schematic diagram illustrating the known basic operation of coordinated multi-AP using time division multiple access (TDMA) for data transmission, according to which APs share time resources instead of frequency resources. There is still only one trigger, which initiates data transmission in the data communication phase.

Figure 5:
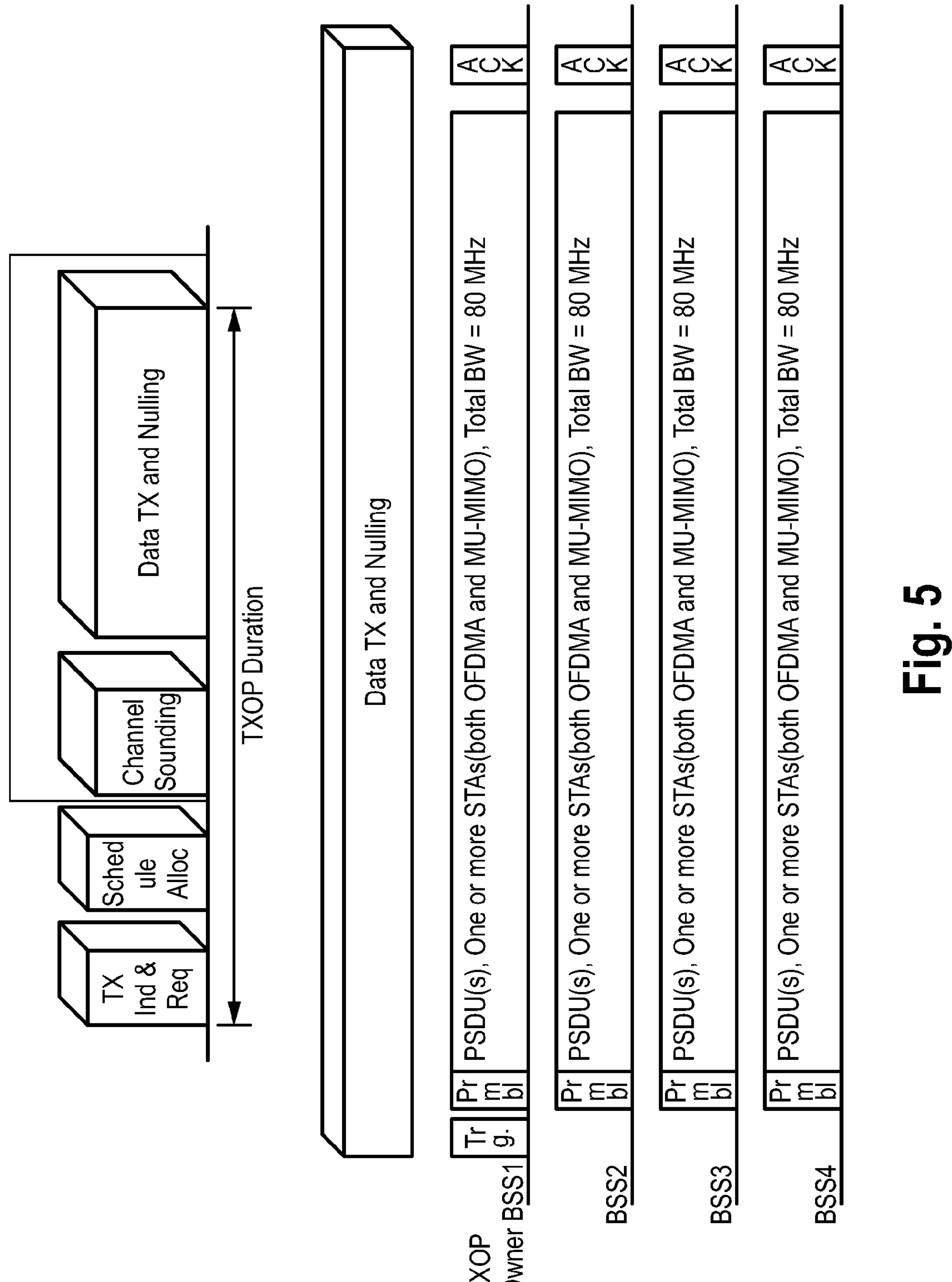
FIG. 5 shows a schematic diagram illustrating coordinated multi-AP using SDMA for data transmission.

FIG. 5 shows a schematic diagram illustrating the known basic operation of coordinated multi-AP using spatial division multiple access (SDMA) for data transmission. In order to figure out the parameters for SDMA such as beamforming matrices, a channel sounding phase precedes the data communication phase in which channel estimation and channel information exchange is performed.

In general, any combination of FDMA, TDMA, and SDMA during the data communication phase may be applied.

The initiation and setup of a coordinated multi-AP TXOP is rather time consuming. The gains that are achieved in the data communication phase are significantly reduced by a long setup phase (representing the TX indication and request phase and the scheduling phase). However, at least part of the setup phase is required to assign resources to each AP to avoid collision in the data communication phase. Thus, the market success of such a scheme depends on the efficiency of the setup phase. The TX Ind & Req phase can be done based on long-term statistics (in particular since the required time for data transmission is rather stable) and may thus be omitted. However, the scheduling phase is needed in order to assign resources to each AP to avoid collisions in the data communication phase. The CTAS sub phase and the CTLS sub phase hold partly redundant information. For these reasons, one of the ideas of the present disclosure targets efficient signaling in the scheduling phase containing the CTAS and CTLS sub phases.

Figure 6:
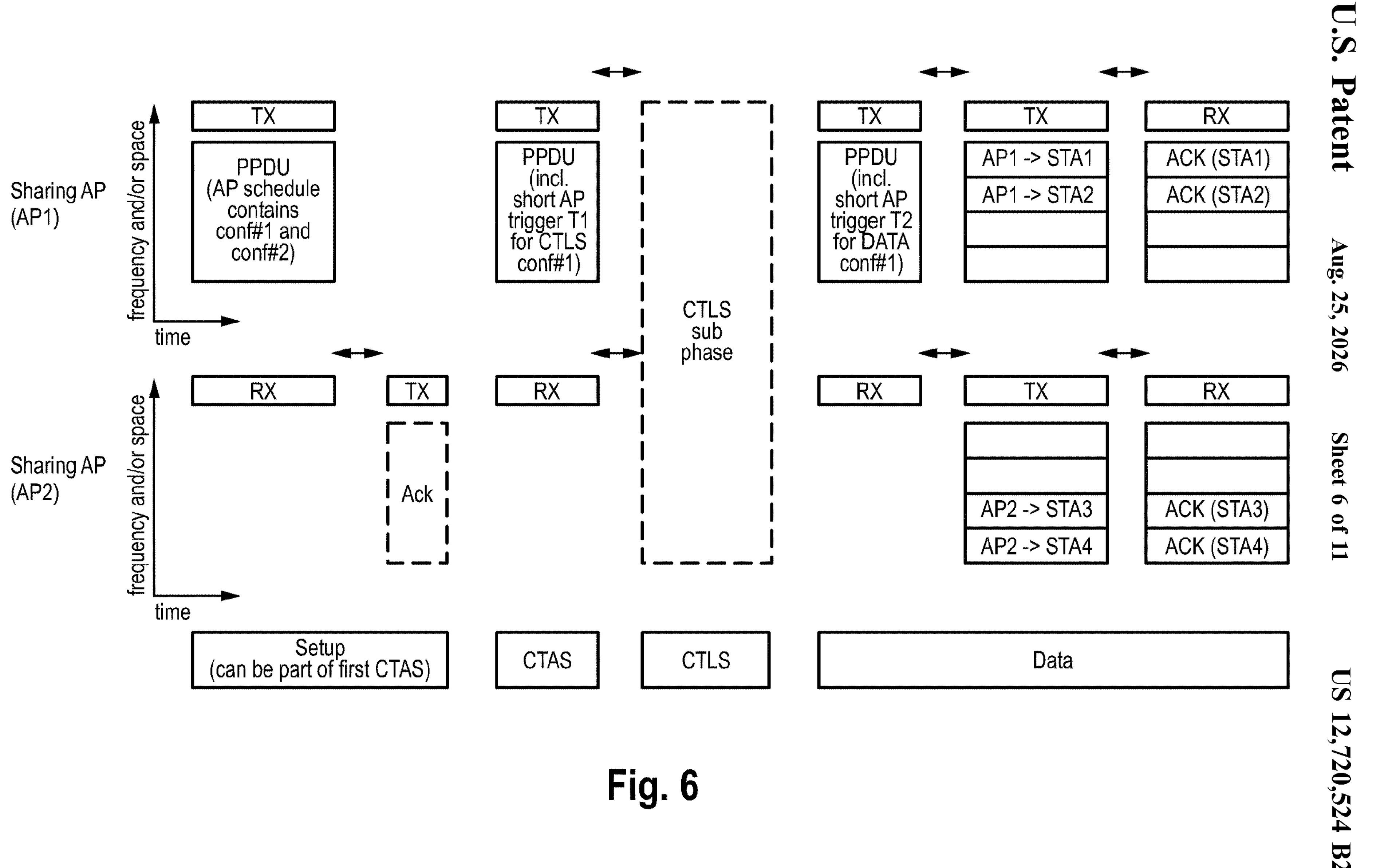
FIG. 6 shows a schematic diagram of an exemplary frame exchange between a sharing AP and shared AP according to an embodiment of the present disclosure.

One of the ideas of the present disclosure focusses on the CTAS sub phase of the scheduling phase. FIG. 6 shows a schematic diagram of an exemplary frame exchange between a sharing AP (AP1) and shared AP (AP2) according to an embodiment of the present disclosure. In a setup phase of the CTAS sub phase, AP1 first announces various (here two) AP schedules (conf #1 and conf #2) to AP2. AP2 may optionally confirm successful reception by an acknowledgement. In a coordinated multi-AP transmission during the CTAS sub phase, AP1 transmits a short first trigger frame T1 (also called first AP trigger information) that indicates the identifier of the AP schedule to be applied in CTLS sub phase and/or data communication phase. Following the CTLS sub phase, AP1 transmits the second short trigger frame T2 (also called second AP trigger information) again to initiate coordinated frame exchange. According to the embodiment shown in FIG. 6, the coordinated frame exchange comprises one aligned transmission followed by an aligned reception from AP view.

Thus, according to this embodiment, the sharing AP (AP1) defines various AP schedules (together forming AP schedule information) that may be applicable in the future, i.e., that schedules, for subsequent data communication phases, the assignment of resources to one or more shared APs to indicate which resources are assigned to a shared AP for data communication in a subsequent data communication phase with its respective associated STAs. Hereby, different resources (e.g. in terms of different resource units) are generally assigned to different shared APs. Each AP schedule holds the same information, e.g. as CTAS frame, and an identifier, but each AP schedule may comprise a different assignment of resources. The AP schedules are announced by the sharing AP (AP1) to any shared AP (AP2) that is part of the AP schedules before any cooperative multi-AP or as part of an initial CTAS sub phase. Each AP stores these AP schedules for future use. Each CTAS sub phase comprises a very short first AP trigger frame T1 that holds an identifier. In case of the initial CTAS sub phase, it may also hold the announcement of the AP schedules, if this option is selected.

The identifier defines the AP schedule that is used for an upcoming data communication phase. Each AP that receives this identifier and the sharing AP selects the appropriate schedule out of the set of AP schedules announced earlier by the identifier within the first short AP trigger frame T1 and applies the respective setting for CTLS and/or data communication phase. In the data communication phase, the second short AP trigger frame T2 is applied again to initiate the coordinated data exchange between each AP and its STAs. Thus, the first short AP trigger frame T1 and/or the second short AP trigger frame T2 holds an indication of the trigger type: A first type (T1) initiates the CTLS phase, whereas a second type (T2) initiates the data communication phase.

Figure 7:
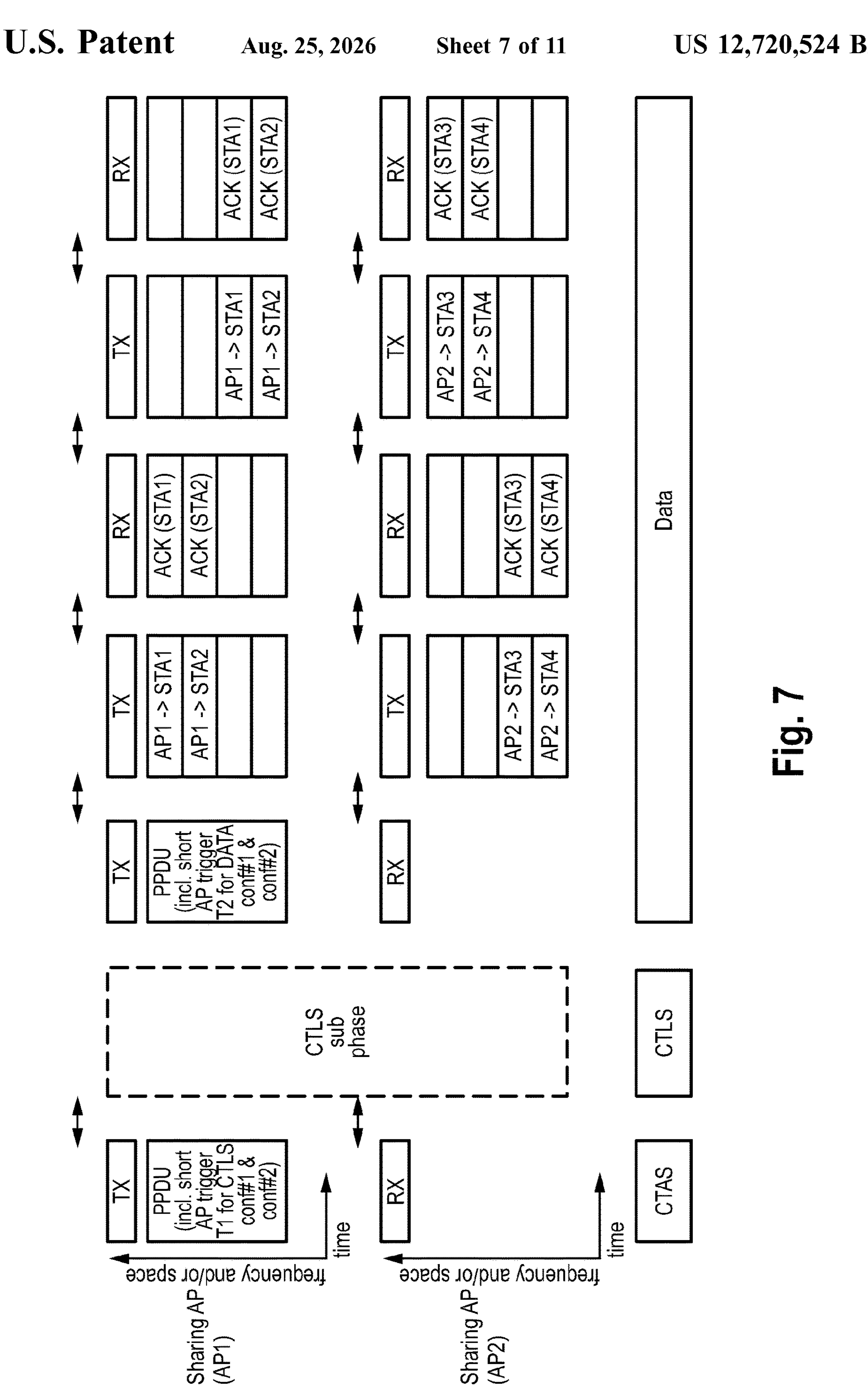
FIG. 7 shows a schematic diagram of an exemplary frame exchange between a sharing AP and shared AP according to another embodiment of the present disclosure.

FIG. 7 shows a schematic diagram of an exemplary frame exchange between a sharing AP (AP1) and shared AP (AP2) according to another embodiment of the present disclosure. It should be noted that in the CTAS sub phase and/or data communication phase two configurations are triggered at same time, which results, in the data communication phase, in two coordinated frame exchanges using a different configuration. The first frame exchange after the second AP trigger (T2) uses configuration #1 whereas the second uses configuration #2.

In general, the data communication phase may begin a fixed time interval, e.g. SIFS (short interframe spacing), after the CTLS sub phase without using the second AP trigger T2, which initiates data communication phase. If the data communication phase begins at SIFS or later than SIFS after the CTLS phase, the second AP trigger T2 shall be used to initiate the data communication phase to be compliant with existing the IEEE802.11 WLAN medium access rules: Another STA is not going to get channel access, if transmission breaks are shorter or equal than SIFS.

The above-described embodiments focused on sharing AP operation in the CTAS sub phase and the initiation of data communication phase. The operation in the CTLS sub phase may be the same as in known systems or may also use a schedule-trigger concept. In the following, another idea referring to the operation in the CTLS phase with a schedule-trigger concept will be explained.

According to this idea, each shared AP defines various STA schedules (together forming STA schedule information) for the STAs it plans to serve in coordinated multi-AP, i.e. it schedules, for subsequent data communication phases, the assignment of resources to one or more associated STAs to indicate which resources are assigned (e.g., which resource units to use) to which STA for data communication in a subsequent data communication phase with the respective shared AP. Hereby, different resources are generally assigned to different stations.

An STA schedule may be defined after the sharing AP announce its AP schedules to the shared APs. Each STA schedule may hold the same information, e.g. as CTLS frame, and an identifier, but each STA schedule may comprise a different assignment of resources. The STA schedules are announced by the shared AP (i.e. they are "locally" announced) to any STA that is part of the STA schedules before any cooperative multi-AP starts or as part of an initial CTLS sub phase. Each STA stores these STA schedules for future use.

Each CTLS comprise a very short trigger frame that holds an identifier. The identifier defines the STA schedule that is used for upcoming data communication phase. Each STA that receives this identifier selects the appropriate STA schedule out of the set of STA schedules announced earlier by the identifier within the short trigger frame and applies the respective setting for the data communication phase.

Figure 8:
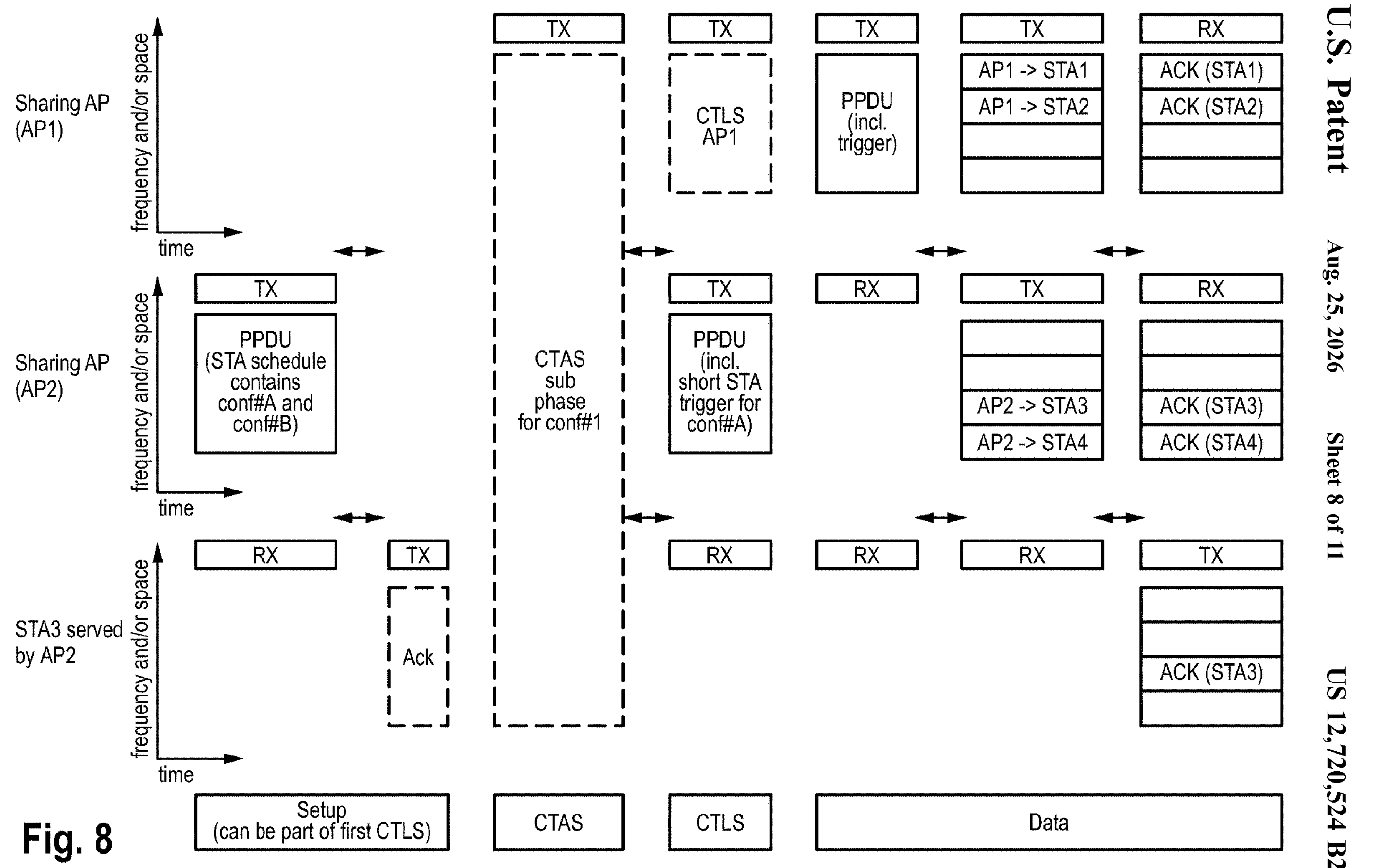
FIG. 8 shows a schematic diagram of an exemplary frame exchange between a shared AP and an associated STA according to another embodiment of the present disclosure.

FIG. 8 shows a schematic diagram of an exemplary frame exchange between a shared AP (AP2) and an STA (STA3) that is served by AP2, wherein AP1 is the sharing AP. In a setup phase of the CTLS sub phase, AP2 first announces various (here two) STA schedules (conf #A and conf #B) to the STAs. The STAs may optionally confirm successful reception by an acknowledgement. In the CTLS sub phase, the shared AP transmits a short trigger frame that indicates the identifier of the STA schedule to be applied by the STAs in the data communication phase. Following the CTLS phase, the sharing AP (AP1) transmits a trigger frame to initiate coordinated frame exchange.

Both concepts of schedule and short trigger in the CTAS and CTLS sub phases can be combined for most efficient operation or can be applied separately. However, it makes most sense to apply the above-described concept to the CTAS sub phase first.

In a first embodiment, the sharing AP defines the resources that each shared AP may use for a data exchange with its STAs. However, the sharing AP has no influence on the STAs that are served by each shared AP.

Figure 9:
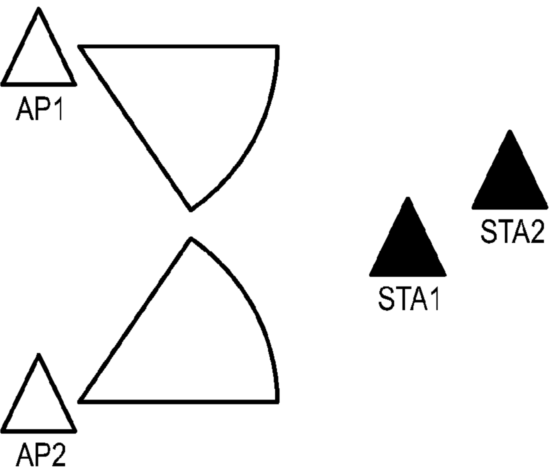
FIG. 9 shows a schematic diagram of a system of two APs and two STAs, in which restrictions are applied.

In a second embodiment, the sharing AP may restrict the STAs, which a shared AP may serve in the data communication phase. This is particularly useful for SDMA-type of communications when there is poor spatial separation among STAs that are served by different APs. An example is illustrated in FIG. 9 showing a schematic diagram of a system of two APs and two STAs, in which restrictions are applied. Here AP1 cannot serve STA1 at same time when AP2 serves STA2, because there is not enough spatial separation present. Thus, AP1 as the sharing AP may restrict SDMA usage for STA2, because it wants to serve STA1 for example.

For the CTAS sub phase, an AP schedule may contain one or more of the following pieces of information:

- an identifier of the AP schedule;
- one or more AP identifiers that identify each shared AP in this AP schedule;
- For each AP:
  - respective time and/or frequency resource allocation;
  - frequency resource indication which indicates the frequency range that the shared AP may use;
  - time resource indication which indicates the time offset from sharing AP's trigger of the data communication phase to the allocation as well as the time period of that allocation which the shared AP may use;
- temporal length of the data communication phase of cooperative multi-AP;
- temporal length of each downlink and uplink phase within the data communication phase of coordinated multi-AP;
- time offset from the actual start of data communication by the respective shared access point to the uplink phase within the data communication phase;
- temporal length of the CTLS sub phase (if not specified in a standard);
- resource allocation the shared AP may use for CTLS sub phase;
- timeout value unit the AP schedule is non-valid;
- STAs that shall not be served by the shared AP for restricted SDMA reasons (those STAs may be identified by their association identifier (AID) or MAC address for example).

For the CTLS sub phase, an STA schedule may contain one or more of the following pieces of information:

- an identifier of the STA schedule;
- one or more STA identifiers (AIDs) that identify single STAs or group identifiers (group ID, GID) that identify a group of STAs (this reflects STA restrictions that are enforced by sharing AP in CTAS);
- entire or subset of information provided in AP schedule, at least timing and/or frequency information such that a STA knows when/where to receive and when/where to transmit data (this information can be extracted from temporal length information in a an AP schedule).

The AP schedule used in the CTAS sub phase generally includes information for all shared APs, whereas the STA schedule used in the CTLS sub phase generally includes information for one shared AP and its STAs only. Thus, by nature of the problem, the information of the STA schedule is generally a subset of the AP schedule as illustrated in FIG. 10 showing a table of an AP schedule and an STA schedule.

Figure 10:
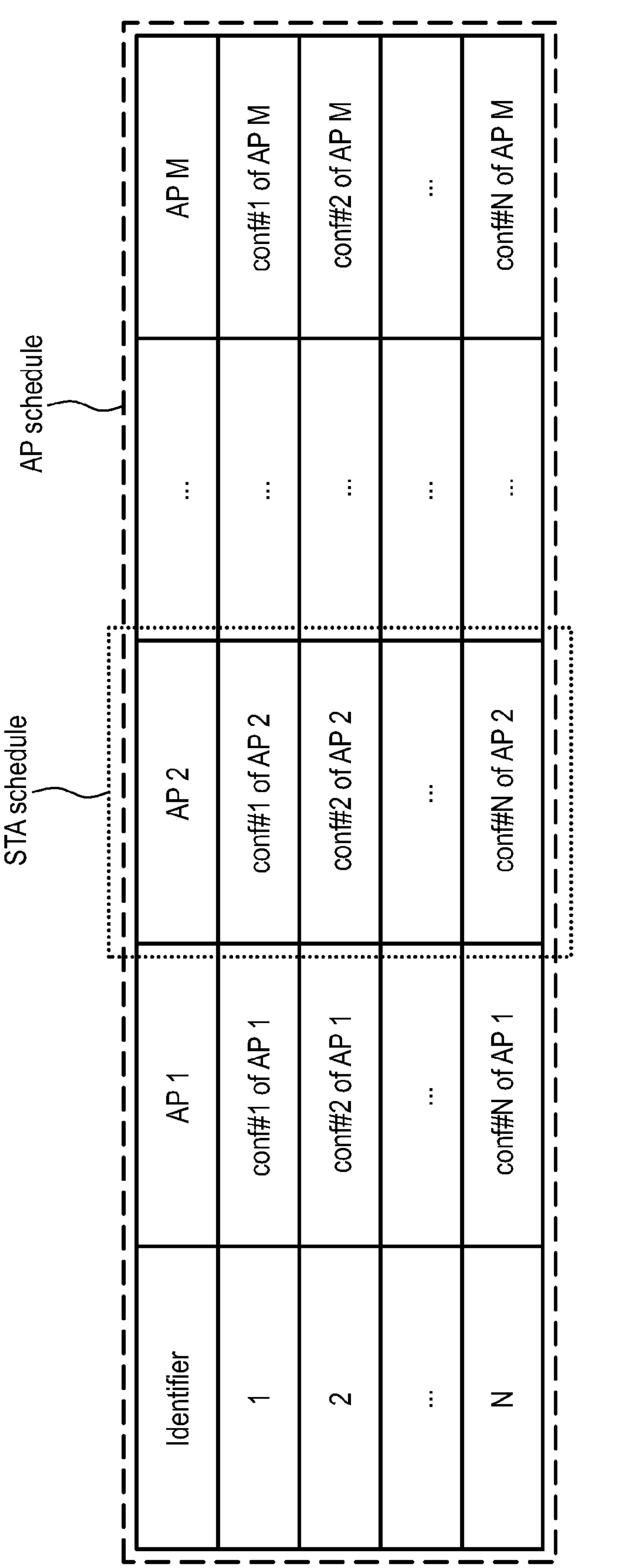
FIG. 10 shows a table of an exemplary AP schedule and an exemplary STA schedule.

FIG. 10 has a table-based representation which requires large signaling overhead. To overcome this overhead the application of a function may be appropriate. This means that an AP may have a mathematical function that returns a configuration based on the identifier as an integer number. Different APs may have different functions or initial values. Applicable functions include a round robin schedule. In this case each AP or STA, respectively, gets assigned an initial resource signaled by a countable identifier. The APs or STAs, respectively, use their respective initial resource for the first time slot. The resource assigned for the second time slot is derived by a circular shift of identifiers. By doing so, a resource allocation similar to the table described above can be achieved at a significant less signaling overhead. Implementation of this procedure may require the trigger to carry an indication of the function (e.g. round robin), function parameters (e.g. direction of the circular shift, maximum resource identifier after which the wrap around occurs), and initial resource configuration.

Figure 11:
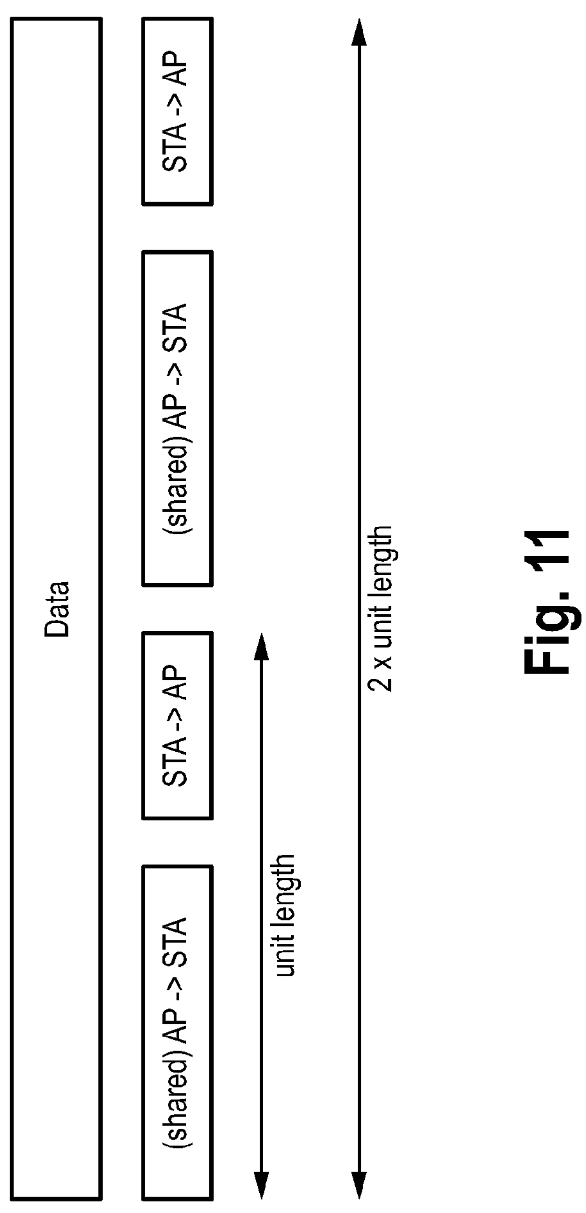
FIG. 11 shows a diagram illustrating the effect of length augmentation.

The AP trigger and/or the STA trigger may contain one or more of the following pieces of information:

- one or more identifiers of the configuration to be triggered;
- the overall length of the coordinated multi-AP TXOP (This length information points to the end of this TXOP, i.e. the information changes when transmitted at different point in time within a coordinated multi-AP TXOP);
- updated information of any information present in the respective AP or STA schedule, which may include:
  - a onetime update only, i.e., an update that applies only for the upcoming CTLS or data part but leaves the related schedule unchanged;
  - a onetime update for length augmentation: multiple of lengths given in CTAS or CTLS schedule may be triggered, as e.g. illustrated in FIG. 11: The schedule defines the unit length. In a short trigger, a length augmentation may be signaled that triggers multiple of the unit lengths. Within each unit length, a frame exchange including a response takes place.

A short AP trigger for the sharing AP only may additionally include an indication if the AP trigger triggers CTLS or data part, i.e., a sharing AP shall trigger the same identifier to solicit data as used to solicit CTLS. A short STA trigger transmitted by a shared AP in the CTLS sub phase shall not trigger a configuration that does not match the configuration advertised by the sharing AP.

The present disclosure provides the advantage of very efficient signaling for coordinated multi-AP operation. Further, it allows very efficient setup of coordinated multi-AP operation that exploits diversity by varying time and/or frequency and/or resources.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

The elements of the disclosed devices, apparatus and systems may be implemented by corresponding hardware and/or software elements, for instance appropriated circuits. A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors which are programmed or configured according to software code. A circuit does not include pure software, although a circuit includes the above-described hardware executing software.

It follows a list of further embodiments of the disclosed subject matter:

1 A first access point comprising circuitry configured to
 generate AP schedule information that schedules, for subsequent data communication phases, the assignment of resources to one or more second access points to indicate which resources are assigned to a second access point for data communication in a subsequent data communication phase with its respective associated second stations, wherein the AP schedule information includes one or more AP schedules each comprising an assignment of resources to the one or more second access points,
 transmit the AP schedule information to the one or more second access points, and
 transmit, before and/or at the start of a data communication phase, AP trigger information to the one or more second access points to indicate which AP schedule to apply for the subsequent data communication phase.

2. The first access point as defined in embodiment 1, wherein the circuitry is configured to transmit first AP trigger information to the one or more second access points before the start of a data communication phase, the first AP trigger information including, in addition to the indication which AP schedule to apply for the subsequent data communication phase, an indication of the start of a scheduling phase, in which the one or more second access points transmit STA schedule information to their associated second stations, the STA schedule information indicating, based on the first AP trigger information, which resources are assigned to a second access point for data communication in the subsequent data communication phase with its respective associated second stations.

3. The first access point as defined in embodiment 2, wherein the circuitry is configured to transmit second AP trigger information to the one or more second access points at the start of a data communication phase, the second AP trigger information including, in addition to the indication which AP schedule to apply for the subsequent data communication phase, an indication of the start of the data communication phase, in which the one or more second access points perform data communication with their associated second stations according to the STA schedule information.

4. The first access point as defined in any one of the preceding embodiments, wherein the circuitry is configured to transmit AP trigger information to the one or more second access points, the AP trigger information including, in addition to the indication which AP schedule to apply for the subsequent data communication phase, an indication of the start of a scheduling phase, in which the one or more second access points initially transmit STA schedule information to their associated second stations, the STA schedule information indicating, based on the AP trigger information, which resources are assigned to a second access point for data communication in the subsequent data communication phase with its respective associated second stations, and then perform data communication with their associated second stations according to the STA schedule information.

5. The first access point as defined in embodiment 2, wherein the data communication phase starts automatically a predetermined interval after the end of the scheduling phase.

6. The first access point as defined in any one of the preceding embodiments, wherein the circuitry is configured to transmit AP trigger information to the one or more second access points to indicate two or more AP schedules to apply for the subsequent data communication phase by respective second access points.

7. The first access point as defined in any one of the preceding embodiments, wherein the circuitry is configured to include in the AP schedule information one or more of:
 an AP schedule identifier per AP schedule for identifying the AP schedule;
 one or more AP identifiers for identifying the one or more second access points;
 time and/or frequency resource allocation information indicating the respective time and/or frequency resource allocation per second access point;
 frequency resource information indicating, per second access point, the frequency range that the respective second access point may use;
 time resource information indicating, per second access point, the time offset from the start of the data communication phase to the actual start of data communication by the respective second access point and/or the time period of the allocation of a resource to the respective second access point;
 data communication phase length information indicating the temporal length of the data communication phase;
 uplink and downlink length information indicating the temporal length of the downlink and uplink phases within the data communication phase;
 time offset from the actual start of data communication by the respective second access point to the uplink phase within the data communication phase;
 scheduling phase length information indicating the temporal length of a scheduling phase, in which the one or more second access points transmit STA schedule information to their associated second stations;
 resource allocation information indicating resource allocation for the one or more second access points in the scheduling phase;
 a timeout value information indicating a timeout value after which the AP schedule in non-valid; and
 restriction information indicating a resource that a second access point is not allowed to use and/or one or more second stations a second access point is not allowed to serve in a subsequent data communication phase.

8. The first access point as defined in any one of the preceding embodiments, wherein the circuitry is configured to include in the AP trigger information one or more of:

one or more AP schedule identifiers for identifying one or more AP schedules to be triggered;

length information indicating the length and/or pointing to the end of the data communication phase and/or indicating the length of a transmit opportunity of the first access point;

update information providing an update of any information included in an AP schedule, including one or more of a onetime update that applies only for the upcoming data communication phase, a onetime update for length augmentation indicating one or more unit lengths of a unit of data communication in the data communication phase;

a start indication indicating the start of the subsequent scheduling phase or the start of the subsequent data communication phase; and restriction information indicating a resource that a second access point is not allowed to use and/or one or more second stations a second access point is not allowed to serve in a subsequent data communication phase.

9. The first access point as defined in any one of the preceding embodiments, wherein the circuitry is configured to generate AP schedule information that schedules, for subsequent data communication phases, the assignment of resources to one or more second access points to indicate which resources are assigned to which second access point for data communication in a subsequent data communication phase with its respective associated second stations.

10. A second access point comprising circuitry configured to generate STA schedule information that schedules, for subsequent data communication phases, the assignment of resources to one or more associated second stations to indicate which resources are assigned to a second station for data communication in a subsequent data communication phase with the second access point, wherein the STA schedule information includes one or more STA schedules each comprising an assignment of resources to the one or more second stations, transmit the STA schedule information to the one or more associated second stations, and transmit, before and/or at the start of a data communication phase, STA trigger information to the one or more associated second stations to indicate which STA schedule to apply for the subsequent data communication phase.

11. The second access point as defined in embodiment 10, wherein the circuitry is configured to generate the STA schedule information based on AP schedule information received from a first access point, the AP schedule information scheduling, for subsequent data communication phases, the assignment of resources to one or more second access points to indicate which resources are assigned to a second access point for data communication in a subsequent data communication phase with its respective associated second stations, wherein the AP schedule information includes one or more AP schedules each comprising an assignment of resources to the one or more second access points.

12. The second access point as defined in embodiment 10 or 11, wherein the circuitry is configured to generate the STA trigger information based on AP schedule information received from a first access point, the AP schedule information scheduling, for subsequent data communication phases, the assignment of resources to one or more second access points to indicate which resources are assigned to a second access point for data communication in a subsequent data communication phase with its respective associated second stations, wherein the AP schedule information includes one or more AP schedules each comprising an assignment of resources to the one or more second access points.

13. The second access point as defined in any one of embodiments 10 to 12, wherein the circuitry is configured to receive and store AP schedule information from a first access point, AP schedule information scheduling, for subsequent data communication phases, the assignment of resources to one or more second access points to indicate which resources are assigned to a second access point for data communication in a subsequent data communication phase with its respective associated second stations, wherein the AP schedule information includes one or more AP schedules each comprising an assignment of resources to the one or more second access points, receive, before and/or at the start of a data communication phase, AP trigger information from the first access point to indicate which AP schedule to apply for the subsequent data communication phase, select the AP schedule indicated by the AP trigger information from the stored AP schedule information, apply the selected AP schedule for the subsequent data communication phase for communicating with its associated one or more second stations.

14. The second access point as defined in embodiment 13, wherein the circuitry is configured to receive, from the first access point, first AP trigger information before the start of a data communication phase, the first AP trigger information including, in addition to the indication which AP schedule to apply for the subsequent data communication phase, an indication of the start of a scheduling phase, in which the one or more second access points transmit the STA schedule information to their associated second stations, and/or second AP trigger information at the start of a data communication phase, the second AP trigger information including, in addition to the indication which AP schedule to apply for the subsequent data communication phase, an indication of the start of the data communication phase, in which the one or more second access points perform data communication with their associated second stations according to the STA schedule information; or AP trigger information including, in addition to the indication which AP schedule to apply for the subsequent data communication phase, an indication of the start of a data communication phase.

15. The second access point as defined in any one of embodiments 10 to 14, wherein the circuitry is configured to include in the STA schedule information one or more of:

an STA schedule identifier per STA schedule for identifying the AP schedule;

one or more STA identifiers for identifying the one or more second stations and/or one or more groups of second stations;

part or all of the information included in the AP schedule information.

16. The second access point as defined in any one of embodiments 10 to 15, wherein the circuitry is configured to include in the STA trigger information one or more of:

one or more STA schedule identifiers for identifying one or more STA schedules to be triggered;

length information indicating the length and/or pointing to the end of the data communication phase and/or indicating the length of a transmit opportunity of the first access point; and update information providing an update of any information included in an STA schedule, including one or more of a onetime update that applies only for the upcoming data communication phase, a onetime update for length augmentation indicating one or more unit lengths of a unit of data communication in the data communication phase.

17. The second access point as defined in any one of embodiments 10 to 16, wherein the circuitry is configured to generate STA schedule information that schedules, for subsequent data communication phases, the assignment of resources to one or more associated second stations to indicate which resources are assigned to which second station for data communication in a subsequent data communication phase with the second access point.

18. The second access point as defined in any one of embodiments 13 to 17, wherein the circuitry is configured to select an STA schedule that corresponds to the AP schedule indicated by the AP trigger information from the stored AP schedule information and indicate the selected STA schedule to its associated second stations.

19. A second access point comprising circuitry configured to receive and store AP schedule information from a first access point, AP schedule information scheduling, for subsequent data communication phases, the assignment of resources to one or more second access points to indicate which resources are assigned to a second access point for data communication in a subsequent data communication phase with its respective associated second stations, wherein the AP schedule information includes one or more AP schedules each comprising an assignment of resources to the one or more second access points, receive, before and/or at the start of a data communication phase, AP trigger information from the first access points to indicate which AP schedule to apply for the subsequent data communication phase, select the AP schedule indicated by the AP trigger information from the stored AP schedule information, apply the selected AP schedule for the subsequent data communication phase for communicating with its associated one or more second stations.

20. The second access point defined in embodiment 19, wherein the circuitry is configured to receive and store AP schedule information from a first access point, AP schedule information scheduling, for subsequent data communication phases, the assignment of resources to one or more second access points to indicate which resources are assigned to which second access point for data communication in a subsequent data communication phase with its respective associated second stations.

21. A first communication method of a first access point, the first communication method comprising generating AP schedule information that schedules, for subsequent data communication phases, the assignment of resources to one or more second access points to indicate which resources are assigned to a second access point for data communication in a subsequent data communication phase with its respective associated second stations, wherein the AP schedule information includes one or more AP schedules each comprising an assignment of resources to the one or more second access points, transmitting the AP schedule information to the one or more second access points, and transmitting, before and/or at the start of a data communication phase, AP trigger information to the one or more second access points to indicate which AP schedule to apply for the subsequent data communication phase.

22. A second communication method of a second access point, the second communication method comprising generating STA schedule information that schedules, for subsequent data communication phases, the assignment of resources to one or more associated second stations to indicate which resources are assigned to a second station for data communication in a subsequent data communication phase with the second access point, wherein the STA schedule information includes two or more STA schedules each comprising an assignment of resources to the one or more second stations, transmitting the STA schedule information to the one or more associated second stations, and transmitting, before and/or at the start of a data communication phase, STA trigger information to the one or more associated second stations to indicate which STA schedule to apply for the subsequent data communication phase.

23. A second communication method of a second access point, the second communication method comprising receiving and storing AP schedule information from a first access point, AP schedule information scheduling, for subsequent data communication phases, the assignment of resources to one or more second access points to indicate which resources are assigned to a second access point for data communication in a subsequent data communication phase with its respective associated second stations, wherein the AP schedule information includes one or more AP schedules each comprising an assignment of resources to the one or more second access points, receiving, before and/or at the start of a data communication phase, AP trigger information from the first access points to indicate which AP schedule to apply for the subsequent data communication phase, selecting the AP schedule indicated by the AP trigger information from the stored AP schedule information, applying the selected AP schedule for the subsequent data communication phase for communicating with its associated one or more second stations.

24. A non-transitory computer-readable recording medium that stores therein a computer program product, which, when executed by a processor, causes the method according to embodiment 21, 22 or 23 to be performed.

25. A computer program comprising program code means for causing a computer to perform the steps of said method according to embodiment 21, 22 or 23 when said computer program is carried out on a computer.

The invention claimed is:

1. A first access point (AP) comprising:

circuitry configured to generate an AP schedule information table that includes schedules, for subsequent data communication phases, assignment of resources to one or more second access points to indicate which resources are assigned to a second access point of the one or more second access points for data communication in a subsequent data communication phase with respective associated second stations, wherein the AP schedule information table includes one or more AP schedules each comprising an assignment of resources to the one or more second access points and identifiers associated with the AP schedules, the first access point being a master AP that coordinates the one or more second access points as slave Aps to suppress mutual interference in a coordinated multi-AP environment, transmit the AP schedule information table to the one or more second access points, and transmit, after transmitting the AP schedule information and at least one of before or at a start of a data communication phase, AP trigger information to the one or more second access points including an identifier of which of the one or more AP schedules included in the previously transmitted in the AP schedule information table to apply for the subsequent data communication phase, wherein the AP schedules are stored by the one or more second access points to reduce signaling overhead through reuse of the AP schedules across multiple subsequent data communication phases.

2. The first access point as claimed in claim 1, wherein the circuitry is configured to transmit first AP trigger information to the one or more second access points before the start of a data communication phase, the first AP trigger information including, in addition to the identifier of which of the one or more AP schedules to apply for the subsequent data communication phase, an indication of a start of a scheduling phase, in which the one or more second access points transmit STA schedule information to associated second stations, the STA schedule information indicating, based on the first AP trigger information, which resources are assigned to a second access point of the one or more second access points for data communication in the subsequent data communication phase with the respective associated second stations.

3. The first access point as claimed in claim 2, wherein the circuitry is configured to transmit second AP trigger information to the one or more second access points at the start of a data communication phase, the second AP trigger information including, in addition to the identifier of which of the one or more AP schedules to apply for the subsequent data communication phase, an indication of the start of the data communication phase, in which the one or more second access points perform data communication with the associated second stations according to the STA schedule information.

4. The first access point as claimed in claim 1, wherein the circuitry is configured to transmit AP trigger information to the one or more second access points, the AP trigger information including, in addition to the identifier of which of the one or more AP schedules to apply for the subsequent data communication phase, an indication of a start of a scheduling phase, in which the one or more second access points initially transmit STA schedule information to associated second stations, the STA schedule information indicating, based on the AP trigger information, which resources are assigned to a second access point of the one or more second access points for data communication in the subsequent data communication phase with the respective associated second stations, and then perform data communication with the associated second stations according to the STA schedule information.

5. The first access point as claimed in claim 2, wherein the data communication phase starts automatically at a predetermined interval after the end of the scheduling phase.

6. The first access point as claimed in claim 1, wherein the circuitry is configured to transmit AP trigger information table to the one or more second access points to indicate two or more AP schedules to apply for the subsequent data communication phase by the respective second access points.

7. The first access point as claimed in claim 1, wherein the circuitry is configured to include in the AP schedule information table one or more of:

an AP schedule identifier per AP schedule for identifying the AP schedule;

one or more AP identifiers for identifying the one or more second access points;

time and/or frequency resource allocation information indicating respective time and/or frequency resource allocation per second access point;

frequency resource information indicating, per second access point, a frequency range that the respective second access point may use;

time resource information indicating, per second access point, a time offset from the start of the data communication phase to an actual start of data communication by the respective second access point and/or a time period of the allocation of a resource to the respective second access point;

data communication phase length information indicating a temporal length of the data communication phase;

uplink and downlink length information indicating a temporal length of the downlink and uplink phases within the data communication phase;

time offset from the actual start of data communication by the respective second access point to an uplink phase within the data communication phase;

scheduling phase length information indicating a temporal length of a scheduling phase, in which the one or more second access points transmit STA schedule information to the associated second stations;

resource allocation information indicating resource allocation for the one or more second access points in the scheduling phase;

a timeout value information indicating a timeout value after which the AP schedule in non-valid; and restriction information indicating a resource that a second access point is not allowed to use and/or one or more second stations a second access point is not allowed to serve in a subsequent data communication phase.

8. The first access point as claimed in claim 1, wherein the circuitry is configured to include in the AP trigger information one or more of:

one or more AP schedule identifiers for identifying one or more AP schedules to be triggered;

length information indicating a length and/or pointing to an end of the data communication phase and/or indicating a length of a transmit opportunity of the first access point;

update information providing an update of any information included in an AP schedule, including one or more of a onetime update that applies only for upcoming data communication phase, a onetime update for length augmentation indicating one or more unit lengths of a unit of data communication in the data communication phase;

a start indication indicating the start of the subsequent scheduling phase or the start of the subsequent data communication phase; and restriction information indicating a resource that a second access point is not allowed to use and/or one or more second stations a second access point is not allowed to serve in a subsequent data communication phase.

9. A second access point (AP) comprising:

circuitry configured to generate a STA schedule information table that schedules, for subsequent data communication phases, assignment of resources to one or more associated second stations to indicate which resources are assigned to a second station of the one or more associated second stations for data communication in a subsequent data communication phase with the second access point, wherein the STA schedule information table includes one or more STA schedules each comprising an assignment of resources to the one or more associated second stations and identifiers associated with the STA schedules, the second access point being a slave AP that receives coordination from a first access point that is a master AP to suppress mutual interference in a coordinated multi-AP environment, transmit the STA schedule information table to the one or more associated second stations, and transmit, after transmission of the STA schedule information table and at least one of before or at a start of a data communication phase, STA trigger information to the one or more associated second stations including an identifier which STA schedule of the one or more STA schedules included in the previously transmitted in the STA schedule information table to apply for the subsequent data communication phase, wherein the STA schedules are stored by the one or more associated second stations to reduce signaling overhead by enabling reuse across multiple subsequent data communication phases.

10. The second access point as claimed in claim 9, wherein the circuitry is configured to generate the STA schedule information table based on an AP schedule information table received from a first access point, the AP schedule information table scheduling, for subsequent data communication phases, assignment of resources to one or more second access points to indicate which resources are assigned to a second access point of the one or more second access points for data communication in a subsequent data communication phase with respective associated second stations, wherein the AP schedule information table includes one or more AP schedules each comprising an assignment of resources to the one or more second access points.

11. The second access point as claimed in claim 9, wherein the circuitry is configured to generate the STA trigger information based on AP schedule information table received from a first access point, the AP schedule information table scheduling, for subsequent data communication phases, assignment of resources to one or more second access points to indicate which resources are assigned to a second access point of the one or more second access points for data communication in a subsequent data communication phase with respective associated second stations, wherein the AP schedule information table includes one or more AP schedules each comprising an assignment of resources to the one or more second access points.

12. The second access point as claimed in claim 9, wherein the circuitry is configured to receive and store an AP schedule information table from a first access point, AP schedule information table scheduling, for subsequent data communication phases, assignment of resources to one or more second access points to indicate which resources are assigned to a second access point of the one or more second access points for data communication in a subsequent data communication phase with respective associated second stations, wherein the AP schedule information table includes one or more AP schedules each comprising an assignment of resources to the one or more second access points, receive, before and/or at the start of a data communication phase, AP trigger information from the first access point to indicate which AP schedule of the one or more AP schedules to apply for the subsequent data communication phase, select the AP schedule indicated by the AP trigger information from the stored AP schedule information table, apply the selected AP schedule for the subsequent data communication phase for communicating with associated one or more second stations.

13. The second access point as claimed in claim 12, wherein the circuitry is configured to receive, from the first access point, first AP trigger information before the start of a data communication phase, the first AP trigger information including, in addition to the identifier of which AP schedule of the one or more AP schedules to apply for the subsequent data communication phase, an indication of a start of a scheduling phase, in which the one or more second access points transmit the STA schedule information to the associated second stations, and/or second AP trigger information at the start of a data communication phase, the second AP trigger information including, in addition to the indication which AP schedule of the one or more AP schedules to apply for the subsequent data communication phase, an indication of the start of the data communication phase, in which the one or more second access points perform data communication with the associated second stations according to the STA schedule information; or AP trigger information including, in addition to the indication which AP schedule of the one or more AP schedules to apply for the subsequent data communication phase, an indication of a start of a data communication phase.

14. The second access point as claimed in claim 9, wherein the circuitry is configured to include in the STA schedule information table one or more of:

an STA schedule identifier per STA schedule for identifying the AP schedule of the one or more AP schedules;

one or more STA identifiers for identifying the one or more second stations and/or one or more groups of second stations;

part or all of the information included in the AP schedule information.

15. The second access point as claimed in claim 9, wherein the circuitry is configured to include in the STA trigger information one or more of:

one or more STA schedule identifiers for identifying one or more STA schedules to be triggered;

length information indicating a length and/or pointing to an end of the data communication phase and/or indicating a length of a transmit opportunity of the first access point; and update information providing an update of any information included in an STA schedule, including one or more of a onetime update that applies only for an upcoming data communication phase, a onetime update for length augmentation indicating one or more unit lengths of a unit of data communication in the data communication phase.

16. A second access point (AP) comprising:

circuitry configured to receive and store an AP schedule information table from a first access point, the AP schedule information scheduling, for subsequent data communication phases, assignment of resources to one or more second access points to indicate which resources are assigned to a second access point of the one or more second access points for data communication in a subsequent data communication phase with respective associated second stations, wherein the AP schedule information table includes one or more AP schedules each comprising an assignment of resources to the one or more second access points, the second access point being a slave AP that receives coordination from a first access point acting that is a master AP to suppress mutual interference in a coordinated multi-AP environment and identifiers associated with the AP schedules, receive, after receiving and storing the AP schedule information table and at least one of before or at a start of a data communication phase, AP trigger information from the first access points to indicate which AP schedule of the one or more AP schedules included in the previously received and stored AP schedule information table to apply for the subsequent data communication phase, select the AP schedule indicated by the AP trigger information table from the stored AP schedule information table, apply the selected AP schedule for the subsequent data communication phase for communicating with associated one or more second stations, wherein the AP schedules are stored by the second access point to reduce signaling overhead by enabling reuse across multiple subsequent data communication phases.

17. A first communication method of a first access point (AP), the first communication method comprising:

generating an AP schedule information table that schedules, for subsequent data communication phases, assignment of resources to one or more second access points to indicate which resources are assigned to a second access point of the one or more second access points for data communication in a subsequent data communication phase with respective associated second stations, wherein the AP schedule information table includes one or more AP schedules each comprising an assignment of resources to the one or more second access points and identifiers associated with the AP schedules, the first access point being a master AP coordinating the one or more second access points as slave APs to suppress mutual interference in a coordinated multi-AP environment, transmitting the AP schedule information table to the one or more second access points, and transmitting, after transmission of the AP schedule information table and at least one of before or at a start of a data communication phase, AP trigger information to the one or more second access points to indicate which AP schedule of the one or more AP schedules included in the AP schedule information previously transmitted to apply for the subsequent data communication phase, wherein the AP schedules are stored by the one or more second access points to reduce signaling overhead by enabling reuse across multiple subsequent data communication phases.

18. A second communication method of a second access point (AP), the second communication method comprising:

generating a STA schedule information table that schedules, for subsequent data communication phases, assignment of resources to one or more associated second stations to indicate which resources are assigned to a second station of the one or more associated second stations for data communication in a subsequent data communication phase with the second access point, wherein the STA schedule information table includes one or more STA schedules each comprising an assignment of resources to the one or more associated second stations and identifiers associated with the STA schedules, the second access point being a slave AP that receives coordination from a first access point that is a master AP to suppress mutual interference in a coordinated multi-AP environment, transmitting the STA schedule information table to the one or more associated second stations, and transmitting, before and/or at a start of a data communication phase, STA trigger information to the one or more associated second stations to indicate which STA schedule of the one or more STA schedules included in the previously transmitted STA schedule information table to apply for the subsequent data communication phase, wherein the STA schedules are stored by the one or more associated second stations to reduce signaling overhead by enabling reuse across multiple subsequent data communication phases.

19. A second communication method of a second access point (AP), the second communication method comprising:

receiving and storing an AP schedule information table from a first access point, the AP schedule information table scheduling, for subsequent data communication phases, assignment of resources to one or more second access points to indicate which resources are assigned to a second access point of the one or more second access points for data communication in a subsequent data communication phase with respective associated second stations, wherein the AP schedule information table includes one or more AP schedules each comprising an assignment of resources to the one or more second access points and identifiers associated with the AP schedules, the second access point being a slave AP that receives coordination from a first access point that is a master AP to suppress mutual interference in a coordinated multi-AP environment, receiving, after receiving and storing the AP schedule information table and at least one of before or at a start of a data communication phase, AP trigger information from the first access points to indicate which AP schedule of the one or more AP schedules included in the previously received and stored AP schedule information table to apply for the subsequent data communication phase, selecting the AP schedule indicated by the AP trigger information table from the stored AP schedule information table, applying the selected AP schedule for the subsequent data communication phase for communicating with the associated one or more second stations, wherein the AP schedules are stored by the second access point to reduce signaling overhead by enabling reuse across multiple subsequent data communication phases.

20. A non-transitory computer-readable recording medium that stores therein a computer program product, which, when executed by a processor, causes the method according to claim 17, 18 or 19 to be performed.

* * * * *